United States Patent
Chen et al.

(10) Patent No.: US 10,320,644 B1
(45) Date of Patent: Jun. 11, 2019

(54) TRAFFIC ANALYZER FOR ISOLATED VIRTUAL NETWORKS

(71) Applicant: Amazon Technologies, Inc., Seattle, WA (US)

(72) Inventors: Po-Chun Chen, Herndon, VA (US); Kyle Tailor Akers, Sterling, VA (US); Kevin Christopher Miller, Fairfax, VA (US); Michael Brooke Furr, Washington, DC (US); Christopher Ian Hendrie, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 14/853,646

(22) Filed: Sep. 14, 2015

(51) Int. Cl.
- *G06F 15/173* (2006.01)
- *H04L 12/26* (2006.01)
- *H04L 12/24* (2006.01)

(52) U.S. Cl.
CPC ........ *H04L 43/0888* (2013.01); *H04L 41/083* (2013.01)

(58) Field of Classification Search
CPC ............. H04L 63/1425; H04L 41/0893; H04L 43/026; H04L 63/0272; H04L 43/0876; H04M 15/58
See application file for complete search history.

(56) References Cited

U.S. PATENT DOCUMENTS

| | | | |
|---|---|---|---|
| 8,102,783 B1 | 1/2012 | Narayanaswamy et al. | |
| 8,612,599 B2 | 12/2013 | Tung et al. | |
| 8,819,701 B2 | 8/2014 | Wheeler et al. | |
| 9,049,216 B2 | 6/2015 | McCanne et al. | |
| 9,055,113 B2 | 6/2015 | Makhija | |
| 9,560,016 B2* | 1/2017 | Zhang | ................. H04L 63/0272 |
| 2006/0251088 A1 | 11/2006 | Thubert et al. | |
| 2008/0225875 A1 | 9/2008 | Wray et al. | |
| 2010/0043068 A1* | 2/2010 | Varadhan | ............ H04L 12/4633 726/15 |
| 2010/0094990 A1 | 4/2010 | Ben-Yehuda et al. | |

(Continued)

FOREIGN PATENT DOCUMENTS

| | | |
|---|---|---|
| CN | 102598591 | 7/2012 |
| EP | 1298853 | 4/2003 |

OTHER PUBLICATIONS

U.S. Appl. No. 14/491,758, filed Feb. 19, 2014, Kevin Christopher Miller et al.

(Continued)

*Primary Examiner* — Shean Tokuta
(74) *Attorney, Agent, or Firm* — Robert C. Kowert; Meyertons, Hood, Kivlin, Kowert & Goetzel, P.C.

(57) ABSTRACT

A traffic analyzer of a provider network identifies endpoint categories into which traffic directed to or from a first isolated virtual network of the provider network is to be classified. A first endpoint category includes an endpoint configured in a second isolated virtual network. Using packet-level metrics collected at virtualization management components of virtualization hosts, the traffic analyzer determines the amount of data transmitted between the first isolated virtual network and the various endpoint categories during selected time intervals. The traffic analyzer provides the categorized traffic amounts as input to a predictive model, and stores expected future traffic trends generated by the model.

21 Claims, 10 Drawing Sheets

(56) References Cited

U.S. PATENT DOCUMENTS

| | | | |
|---|---|---|---|
| 2013/0196615 A1* | 8/2013 | Zalmanovitch | H04W 24/02 455/405 |
| 2014/0047099 A1 | 2/2014 | Flores et al. | |
| 2014/0115319 A1* | 4/2014 | May | H04L 63/0428 713/150 |
| 2014/0215058 A1 | 7/2014 | Vicat-Blanc et al. | |
| 2014/0280884 A1* | 9/2014 | Searle | H04L 43/0864 709/224 |
| 2015/0055659 A1* | 2/2015 | Testicioglu | H04L 47/6225 370/412 |
| 2015/0332155 A1* | 11/2015 | Mermoud | G06N 99/005 706/12 |

OTHER PUBLICATIONS

U.S. Appl. No. 14/746,519, filed Jun. 22, 2015, Kyle Tailor Akers et al.
Srikanth Kandula, et al., "The Nature of Datacenter Traffic: Measurements and Analysis", ICM '09, Nov. 4-6, 2009, pp. 202-208, Chicago, Illinois, USA.
Amazon Web Services, "Amazon Virtual Private Cloud User Guide", API Version, Apr. 15, 2015, pp. 1-206.
Masahiro Satou, et al., "Server Side Networking for Cloud Data Centers", 2012 IEEE 1st International Conference on Cloud Networking (CLOUDNET), Nov. 28, 2012, pp. 17-22.
Kapil Bakshi, "Considerations for Software Defined Networking (SDN): Approaches and Use Cases", Aerospace Conference, 2013 IEEE, Mar. 2, 2013, pp. 1-9.
U.S. Appl. No. 15/179,739, filed Jun. 10, 2016, Eric W, Schultze.
U.S. Appl. No. 13/833,945, filed Mar. 15, 2013, Ian Roger Searte.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhong Mcclenahan.
U.S. Appl. No. 14/736,165, filed Jun. 10, 2015, Colm Maccarthaigh.
U.S. Appl. No. 16/029,468, filed Jul. 6, 2018, Kyle Tailor Akers.
U.S. Appl. No. 16/056,078, filed Aug. 6, 2018, Unknown.
U.S. Appl. No. 15/439,751, filed on Mihir Sadruddin Surani.
U.S. Appl. No. 15/632,258, filed on Benjamin David Strauss.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 141822,704, filed Aug. 10, 2015, Daniel T. Cohn.
U.S. Appl. No. 141853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

* cited by examiner

TRAFFIC ANALYZER FOR ISOLATED VIRTUAL NETWORKS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

As demand for virtualization-based services at provider networks has grown, more and more networking and inter-connectivity-related features have been added to the services. For example, some providers configure groups of resources as isolated virtual networks at the request of customers, with substantial flexibility being provided to the customers with respect to the networking configuration details within their particular subsets of the provider network resources. As customers may assign IP (Internet Protocol) addresses within their isolated virtual networks independently of the addresses assigned at other isolated virtual networks, managing traffic in and out of the isolated virtual networks may require the use of encapsulation and/or various types of address translation techniques. In some cases, it may be possible to configure several different types of pathways for traffic between one isolated virtual network and another (e.g., via external intermediary networks, or via peering connections managed entirely within the provider network), or for traffic between one isolated virtual network and various other network-accessible services. For a customer on whose behalf an isolated virtual network is established, it may not be straightforward to choose among the various feasible connectivity options, especially in view of dynamically changing workloads.

Figure 1:
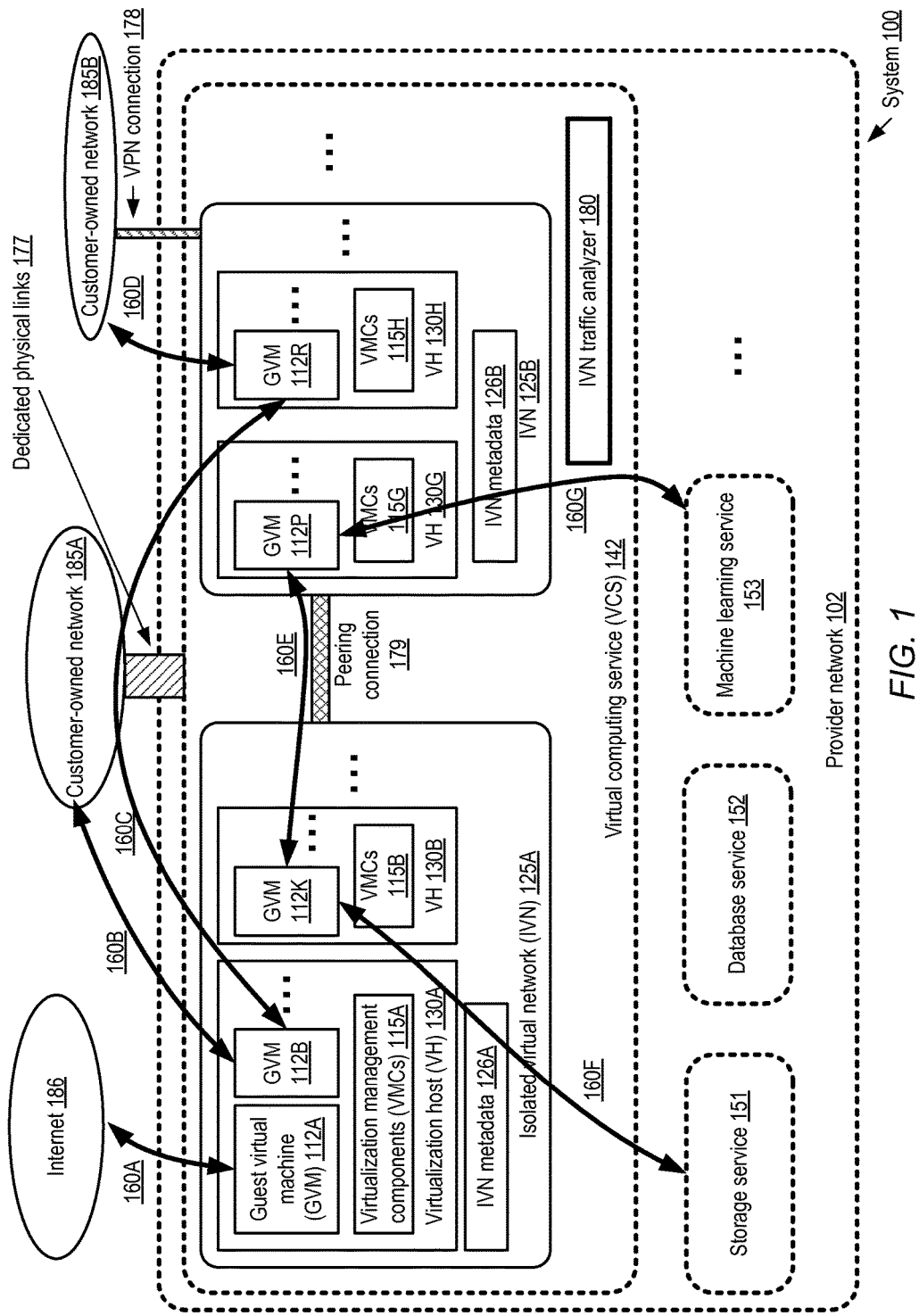
FIG. 1 illustrates an example system environment in which a traffic analyzer may be implemented for network traffic associated with various isolated virtual networks, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for traffic analysis, categorization and prediction with respect to isolated virtual networks of a provider network's virtual computing service are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Some provider networks may also be referred to as "public cloud" environments. The term "multi-tenant service" refers to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines on behalf of respective clients at a given hardware server, without any of the clients being informed that the hardware server is being shared with other clients. Guest virtual machines may also be referred to as "compute instances" or simply as "instances" herein, and the hardware servers on which one or more instances are resident may be referred to as "virtualization hosts" or "instance hosts". Clients may run any desired collection of applications on the compute instances set up on their behalf in various embodiments, such as various web-services based applications, databases, and the like. A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

Some VCSs may have been initially set up to provide a relatively small core set of features, such as the ability for clients to request allocation of guest virtual machines (GVMs) or compute instances with performance characteristics corresponding to a selected "instance type". Examples of such instance types may include "small", "medium" or "large" instances, each of which may be configured with different combinations of CPUs, memory, networking and/or storage. Each of the instances may be assigned a "public" network address (e.g., an IP (Internet Protocol) address accessible from outside the provider network, such as from a client's premises) and/or a "private" network address (an IP address accessible only from within the provider network) in some embodiments. Components of a virtualization management software stack (such as a hypervisor or an administrative domain operating system) of the virtualization hosts may be responsible for handling interactions between the compute instances and the hardware components of the virtualization hosts, including for example the hardware network interface cards (NICs) over which the traffic of the different compute instances of the host has to flow. It is noted that at least in some embodiments, a private IP address (as the term is used in this document) may not necessarily be compliant with some or all of the IETF (Internet Engineering Task Force) standards pertaining to address allocation for private networks, such as RFC (Requests for Comments) 1918 (for IP version 4) or RFC 4193 (for IP version 6).

Over time, additional features may be added to the core capabilities of a VCS. For example, in at least some embodiments, the VCS network may be partitioned into a plurality of logical partitions, with more sophisticated network isolation techniques being used for some partitions than for others. Such isolation techniques may be implemented, for example, in response to client needs for greater networking configuration autonomy and greater security. In one logical partition of the VCS, for example, clients may be able to request the establishment of isolated virtual networks (IVNs), with each IVN comprising some set of virtual and/or physical resources allocated to the client and provided protection from accesses originating outside the IVN. A client may be granted substantial networking configuration flexibility for the IVN. For example, clients may assign IP addresses of their choice with the isolated virtual network (without being concerned with the possibility of conflicts with IP addresses assigned in other IVNs), set up subnets and routes, and so on, in a manner very similar to the way that network configuration settings could be selected at a customer-owned facility. In order to support secure connectivity between the compute instances of a particular IVN and a client network outside the provider network, various techniques may be supported in different embodiments, such as the use of VPN (virtual private network) connections and/or the use of dedicated direct physical links (sometimes called "direct connect" links) between client-owned routers and provider network-owned routers. VPN connections and/or dedicated direct physical links may require the configuration of virtual private gateways (VPGs) at the corresponding IVNs in some embodiments. Numerous layers of intermediary networking devices and associated metadata may have to be set up to support IVNs in at least some embodiments.

By default, the network addresses assigned to the GVMs established within a given IVN may not be visible (or accessed from) outside the IVN. For many applications, however, it may be the case that a given GVM may have to communicate with entities outside its IVN. In various embodiments, a number of alternative approaches may be available with respect to the manner in which packets are directed to/from a given IVN to network endpoints or addresses outside the IVN. For example, in some cases traffic between one IVN and another (e.g., between a particular guest virtual machine GVM1, established at IVN1, and another guest virtual machine GVM2 established at IVN2) may flow via an external network, such as a customer network CN1 owned by the client on whose behalf the two IVNs IVN1 and IVN2 were established. Consider a scenario in which CN1 has a dedicated direct physical link DPL1 associated with a particular virtual private gateway VPG1 configured for IVN1, and another dedicated direct physical link DPL2 associated with another virtual private gateway VPG2 configured for IVN2. In such a scenario, the path taken by a packet originating at GVM1 and directed to GVM2 may comprise GVM1→VPG1→DPL1→CN1→DPL2→VPG2→GVM2 (and may also include other intermediary devices such as VCS edge routers, customer network routers etc.). Some of the traffic flowing out of IVN1 via DPL1 may be directed to destinations within CN1, while other traffic may be directed to destinations such as GVN2 within IVN2. From the perspective of an IVN1 owner or administrator, it may be heard to distinguish between these two kinds of traffic—the packets whose final destinations are in CN1, and the packets whose final destinations are in IVN2. In some cases, instead of using the dedicated physical links, VPN connections may be established over shared physical links between the IVNs and the external networks such as CN1. In addition to the feasible pathways via external networks, in some embodiments the VCS may support one or more types of internal pathways—e.g., the establishment of so-called "IVN peering" may be permitted, in which route entries for the other IVN may be added directly to routing tables at each of the IVNs, and the VCS may transfer packets from one IVN to the other without utilizing external networks. In some embodiments, alternative pathways may be available for traffic between an IVN and services other than the VCS (e.g., a storage service or a database service) which are implemented at the provider network. For example, as discussed below, some publicly-accessible services (i.e., services accessible via addresses advertised over the public Internet) may be accessed from within an IVN using an Internet gateway configured for the IVN and devices accessible from the public Internet. In one alternative to such public access, private alias endpoints may be configured for the IVN as discussed below, enabling the normally publicly-accessible services to be accessed using private pathways of the provider network.

As the types of pathways and endpoints which can potentially be used for the incoming or outgoing traffic of an IVN increases, the owners or administrators of the IVNs may have to make decisions regarding the particular connectivity configurations they wish to employ for the applications being executed within their IVNs. In order to enable the IVN owners/administrators to make informed decisions, in various embodiments one or more traffic analyzers and/or other tools which utilize metrics collected at the virtualization hosts may be implemented, e.g., using one or more computing devices of the control plane (administrative portion) of the provider network or the VCS. In general, the IP addresses assigned to a given virtualization host's network interface card (NIC) may differ from the various IP addresses assigned to the GVMs established on the host, so the virtualization management components (VMCs) at the host may implement an encapsulation technique involving the use of hardware-to-GVM address mappings. At a very high level, the encapsulation technique or protocol may comprise the following: A baseline packet originally generated at a GVM may be encapsulated within a packet generated at a VMC, and transmitted via the source host's NIC to the destination host's NIC via a route indicated in an IVN routing table. At the destination host, the baseline packet may be de-capsulated or extracted by the VMC, and passed on to the appropriate destination GVM. According to one embodiment, in addition to implementing the encapsulation protocol, a VMC at a virtualization host may collect a set of metrics for various incoming and/or outgoing network packets with respect to the GVMs. Such metrics for a given packet may include, for example, an identifier of the source IVN for a packet (e.g., "IVN-0x2316"), the IP address assigned to the source GVM of the packet, the IP address assigned to the destination GVM, the size of the packet, and a timestamp. In some embodiments, the per-packet metrics may be transmitted to or saved at a metrics repository which does not perform operations required for client application workflows, so as to minimize the impact of the metrics collection on client applications. It is noted that at least a portion of the collected metrics may also be used for billing and/or other purposes in some embodiments—that is, the per-packet metrics may be consumed by entities other than the traffic analyzer.

In various embodiments, the traffic analyzer may operate asynchronously with respect to the metrics collection, and may utilize computing devices which are also not directly involved in processing of customer applications. The traffic analyzer may obtain input from at least two sources in some embodiments: the repository of per-packet metrics collected at the VMCs, and a (potentially distributed) database of IVN configuration metadata (e.g., routing table entries for various IVNs, gateway settings, VPN settings, direct connect settings, and the like). With respect to inbound and/or outbound traffic associated with a given IVN, the traffic analyzer may identify one or more endpoint categories among which the packets can be classified. For example, the categories identified with respect to a particular IVN1 may include IVN2, ..., IVN-k (for various other IVNs with which the GVMs of IVN1 communicate), Service1, ..., Service-j (for various non-VCS services with which the GVMs of IVN1 communicate), external networks (e.g., customer networks or the public Internet), and so on. In some embodiments, the categories may be distinguished from one another not just in the set of endpoints included, but also by the connectivity mechanism used (e.g., "VPN" versus "dedicated private link" with respect to an external customer network). The traffic analyzer may then compute, with respect to each endpoint category and one or more selected time periods, the respective amounts of data transferred between the IVN and the endpoints of the category. For example, over a given hour, the traffic analyzer may determine that 5 Gigabytes (GB) of traffic was transferred between IVN1 and IVN2, 3 GB between IVN1 and IVN3, while over the next hour the IVN1-IVN2 traffic may have been 6 GB and the IVN1-IVN3 traffic may have been 2 GB, and so on.

In at least some embodiments, the traffic analyzer may use the traffic distribution information it has generated as input to a predictive model (e.g., a regression model or a time series model). Expected trends in future traffic for the various categories with respect to the IVN under analysis (IVN1 in the above example) may be estimated or obtained from the model. In various embodiments, at least a portion of the per-endpoint-category distribution data and/or the predictions may be provided via programmatic interfaces to the owners/administrators of the IVN. The predictions and/or distribution information may help the recipients to make informed configuration decisions—e.g., if the expected traffic via a dedicated direct physical link is anticipated to reach the maximum supported traffic rate of the link, another link may be configured, or a peering connection may be established for IVN-to-IVN traffic which happens to be currently using the dedicated direct physical link. In at least some embodiments, the traffic analyzer may develop configuration recommendations using the expected trends, and provide such recommendations to the IVN owners. In some cases the recommendations may include proposed changes which may help alleviate possible bottlenecks or avoid reaching performance limits of the components being used, while in other cases the recommendations may suggest that the current configurations appear to be adequate for the time period for which predictions were generated by the model. Specific recommendations for configuration changes generated by the traffic analyzer may include, for example, deploying additional data plane components for pathways already in use (e.g., new instances of routers, physical links, gateways and the like, or increasing the available link bandwidth), or establishing an additional network pathway between the IVN and a collection of endpoints (and potentially replacing a currently-used pathway with the additional pathway). For example, prior to the generation of the recommendation, the IVN whose traffic is being analyzed may have communicated with a second IVN via a pathway which includes a dedicated direct physical link and/or an intermediary external network (e.g., a client network or a portion of the public Internet), and the traffic analyzer may recommend that a new IVN-to-IVN peering connection be established to replace the current pathway. The traffic analyzer may operate in a continuous mode in some embodiments, updating its analyses as more metrics are collected and as and when the networking configuration of the IVNs changes. In other embodiments, the traffic analyzer may be invoked or instantiated on-demand, e.g., in response to various programmatic requests submitted by clients.

Example System Environment

FIG. 1 illustrates an example system environment in which a traffic analyzer may be implemented for network traffic associated with various isolated virtual networks, according to at least some embodiments. As shown, system 100 comprises a provider network 102 at which a number of network-accessible services are implemented, including a virtual computing service (VCS) 142, a storage service 151, a database service 152, and a machine learning service 153. The VCS 142 may comprise numerous virtualization hosts (VHs), such as VH 130A, 130B, 130F and 130G. One or more guest virtual machines (GVMs) 112 may be instantiated at each VH 130 at a given point in time—e.g., GVMs 112A and 112B are established at VH 130A, GVM 112K is set up at VH 130B, GVM 112P is launched at VH 130F, and GVM 112R is configured at VH 130G. Each virtualization host 130 may also comprise a set of virtualization management components (VMCs) 115, such as VMCs 115A at VH 130A, VMCs 115B at VH 130B, VMCs 115F at VH 130F, and VMCs 115G at VH 130G. The VMCs 115 at a given host may include, for example, a hypervisor and/or an instance of an operating system running in a privileged domain (sometimes referred to as "dom-0"). The VMCs may act as intermediaries between the GVMs and hardware devices of the VHs such as processors/cores, network interface cards (NICs), storage/memory devices, peripheral input/output devices and the like.

A number of isolated virtual networks (IVNs) such as IVN 125A and IVN 125B may be established using the resources of the VCS 142 in the provider network 102, e.g., in response to programmatic requests received from VCS clients. A given IVN 125 may comprising a set of GVMs 112 (and/or other resources) allocated to a particular client account, and protected (at least by default) from network accesses originating outside the IVN. At a high level, from a client perspective, IVNs may be intended to provide security benefits similar to (and in some cases better than) those of a network set up entirely on client premises, together with the scalability and manageability benefits associated with services implemented at provider networks. A client may be granted substantial networking configuration flexibility for an IVN. For example, clients may assign IP addresses of their choice within the isolated virtual network (without being concerned with the possibility of conflicts with IP addresses assigned in other IVNs), set up subnets and routes, and so on, in a manner very similar to the way that network configuration settings could be selected at a customer-owned facility. In one implementation, a client may select a range of private IP (Internet Protocol) addresses to be used within an IVN, such as "10.0.0.0/16" expressed in CIDR (Classless Inter-Domain Routing) notation. One or more subnets corresponding to various sub-ranges of the IVN's address range (such as "10.0.1.0/24", "10.0.2.0/24", etc. in the above example) may be established. Each subnet may be associated with respective route tables, security settings and the like. Different subnets within a given IVN may be used for different applications, and may be configured with respective gateways (e.g., Internet gateways or virtual private gateways) to establish connectivity with selected entities outside the IVN. New GVMs may be instantiated at the client's request as and when required, e.g., within the particular subnet and IVN which meet the networking connectivity requirements of the applications to be deployed at the new GVMs.

The applications running on a given GVM 112 of an IVN 125 may require connectivity to a variety of communication endpoints—e.g., GVMs within the same IVN, GVMs within different IVNs owned by the same client or a different client, endpoints located in customer-owned networks such as 185A or 185B, devices of the public Internet 186, devices of various other services of the provider network such as services 151, 152, or 153, and so on. In FIG. 1, a number of GVM communication requirements with respect to entities outside the parent IVN in which the GVM is established are illustrated using double-headed arrows 160. For example, GVM 112A of IVN 125A requires connectivity to the public Internet 186, as indicated by arrow 160A. GVM 112B communicates with endpoints in customer-owned network 185A, as indicated by arrow 160B, and with GVM 112R of IVN 125B via customer-owned network as indicated by arrow 160C. GVM 112K communicates with storage service 151 (arrow 160F), and with GVM 112P of IVN 125B (arrow 160E). GVM 112P in turn communicates with machine learning service 152, as indicated by arrow 160G, and GVM 112R communicates with a second customer-owned network 185B (arrow 160D). Of course, the GVMs within a given IVN may also communicate with each other; such intra-IVN connectivity requirements are not shown in FIG. 1.

In order to accommodate all the different types of requirements for communication across IVN boundaries, a variety of configuration options may be available in the embodiment shown in FIG. 1. For traffic between an IVN and endpoints of the public Internet (e.g., as indicated by arrow 160A), a client may request the establishment of an Internet gateway at the IVN. For secure connectivity between an IVN (e.g., 125A) and a customer-owned network such as 185A or 185B, in some embodiments a direct dedicated physical link 177 (which may be referred to as a "direct connect" link) may be established at the client's request. The dedicated physical link 177 may, for example, comprise a cable (e.g., with a 1 Gbit/second or 10 Gbit/second capacity) set up at a router co-location facility between a provider network-owned router and a customer-owned or third-party router. Several different such dedicated physical links 177 may be established on behalf of the same VCS client (for one or more customer-owned networks). Another option for secure connectivity between an IVN and a customer-owned network such as 185B may include the establishment of a Virtual Private Network (VPN) connection such as 178. In at least some embodiments, a virtual private gateway may be established at an IVN to enable connectivity via a VPN connection 178 and/or a dedicated physical link 177. In some cases, traffic between two GVMs launched within different IVNs (e.g., GVM 112B of IVN 125A and 112R of GVM 125B) may flow via a customer-owned network such as 185A, e.g., using a dedicated physical link 177 or a VPN connection. In the depicted embodiment, the VCS 142 may also support peering connections 179 between IVNs whose address ranges do not overlap. To establish such a peering connection 179, the customers who own both ("peer") VPCs such as 125A and 125B may have to agree to modify the security settings of both VPCs appropriately, and set up routing table entries at each VPC for the peer VPC's address range.

For traffic between an IVN and a service such as services 151, 152 or 153, the configuration options available may vary on a per-service basis. Some services may require public IP addresses to be used for service requests, in which case service requests from a GVN within an IVN may have to be transmitted via a path or device accessible from the public Internet. In other cases, the service may allow packets to be directed to its endpoints using private addresses which are not visible outside the provider network, e.g., using private alias endpoints which can be configured for the IVNs. Further details regarding private alias endpoints are provided below with respect to FIG. 3. A number of other devices not shown in FIG. 1, such as edge routers of the VCS, tunneling intermediary devices, internal bridge network devices of the provider network, etc., may also be employed for the various types of traffic to/from GVMs 112 in various embodiments.

With respect to each IVN 125, corresponding IVN metadata 126 (e.g., metadata 126A for IVN 125A, and metadata 126B for IVN 125B) may be stored at control plane or administrative components of the VCS such as the VMCs 115. The metadata may include various networking configuration information details of the IVNs, such as private IP address ranges, public IP addresses used/assigned within the IVN, subnet definitions, routing table entries, gateways, mappings between VH IP addresses and GVM IP addresses, etc.

Given the multiplicity of connectivity options available, it may sometimes be difficult for an owner of an IVN to decide whether the current configuration settings of the IVN are adequate for handling the changing traffic needs of the applications being run at the GVMs of the IVN, or whether some configuration changes would be beneficial. In order to provide visibility into the distribution of network traffic directed to/from a given IVN to various categories of endpoints outside the IVN, and to help with making configuration decisions with respect to anticipated future traffic, IVN traffic analyzer 180 may be implemented at one or more computing devices of the VCS control plane in the depicted embodiment. Virtualization management components 115 may collect respective sets of metrics with respect to incoming and outgoing packets of the various GVMs, and place the metrics in a repository accessible by the traffic analyzer 180. The metrics for a given packet may include, for example, the identifier of the source IVN (if the packet originated at an IVN), the source and destination IP addresses, the size of the packet, and/or a timestamp. The traffic analyzer 180 may identify, with respect to each IVN 125, one or more endpoint categories into which the IVN's traffic should be classified. For example, the endpoint categories identified for IVN 125A may include IVN 126A endpoints, the public Internet, customer-owned network 185A, and storage service 151A, while the endpoint categories identified with respect to IVN 125B may include IVN 125A, machine learning service 153, and customer-owned networks 185A and 185B. The set of endpoint categories may be identified, for example, based on analysis of the per-packet metrics, and/or based on input received programmatically from the IVN owners. The traffic analyzer may use the per-packet metrics and IVN metadata 126 (e.g., IVN metadata 126A or 126B) to determine the amount of traffic flowing between a given IVN and the endpoints of the various identified endpoint categories over various time intervals, thus obtaining a temporal categorized distribution of traffic that crosses IVN boundaries. Several different types of per-IVN traffic measurements may be obtained for each endpoint category and each time interval in some embodiments, such as peak traffic rates and average traffic rates for inbound traffic (packets received at the IVN) and outbound traffic (packets sent from the IVN).

The traffic analyzer 180 may include or utilize one or more prediction models in various embodiments, such as regression models, time-series models or the like. The traffic distribution information for a given IVN may be provided as input to the prediction models, and expected trends of future traffic may be produced as output by the models. In at least one embodiment, the traffic analyzer may be able to generate configuration recommendations based on the predictions—e.g., whether the current configuration is adequate based on the predictions, or whether a particular configuration change (such as an increase in bandwidth capacity using a new dedicated physical link 177, a new VPN connection 178, or a new peering connection 179) may be advisable. In some cases, instead of advocating the use of a completely new kind of pathway, the recommendations may suggest that additional data plane resources of the IVN (such as routers, links between routers, and the like) be deployed for an existing pathway. The traffic analyzer 180 may provide the categorized traffic distribution information, the predictions, and or the configuration recommendations programmatically to clients such as IVN owners or administrators in various embodiments. Using the traffic analyzer, VCS customers may obtain new insights into the networking behavior of their IVN-based applications at the appropriate granularity, and improve the process of identifying and budgeting for data-driven configuration changes.

Packet Flow Between IVNs

Figure 2:
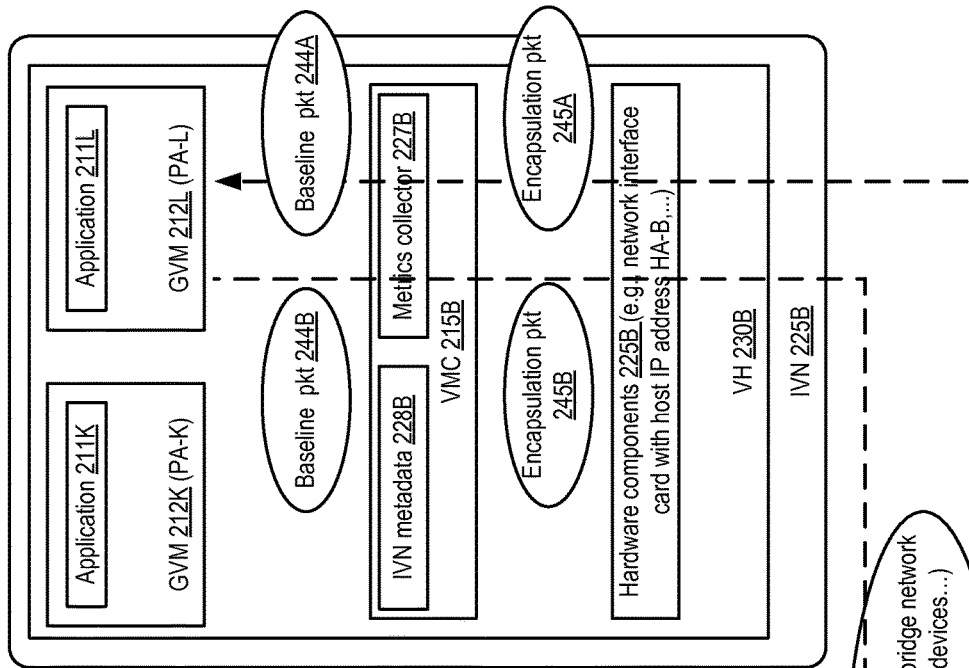
FIG. 2 illustrates an overview of network paths between guest virtual machines implemented at respective virtualization hosts of a virtual computing service, according to at least some embodiments.
Figure 2:
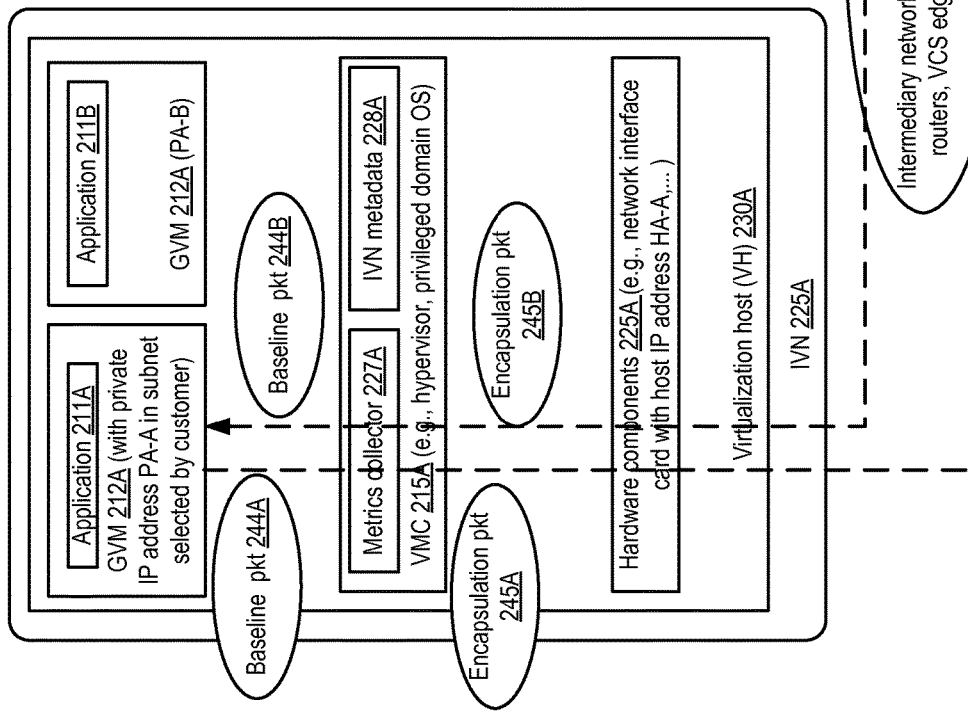

FIG. 2 illustrates an overview of network paths between guest virtual machines implemented at respective virtualization hosts of a virtual computing service, according to at least some embodiments. Two virtualization hosts are shown: VH 230A in IVN 225A and VH 230B in IVN 225B. Each virtualization host may comprise one or more guest virtual machines, such as GVMs 212A and 212B at VH 130A, and GVMs 212K and 212L at VH 130B. In the depicted embodiment, each GVM 212 may be assigned at least one private IP address (such as PA-A, PA-B, PA-K or PA-L for GVMs 212A, 212B, 212K and 212L respectively), e.g., from the range of addresses of a subnet previously set up by the customer on whose behalf the IVN containing the GVM is established. For example, if the IP address range 10.0.0.0/16 is designated for IVN 225A, and GVMs 212A and 212B are set up in a subnet 10.0.1.0/24, then GVM 212A and 212B may each be assigned a different address in the range 10.0.1.0-10.0.1.255.

Each GVM 212 may comprise one or more application processes 211 in the depicted embodiment, such as applications 211A, 211B, 211K or 211D. A given application such as 211A may generate messages to be set to other applications, such as 211L. Such an application message may be incorporated within one or more baseline network packets (such as packet 244A, in the case of application 211A) prepared by the networking software stack of the operating system at the GVM where the application runs. The baseline packet may, for example, indicate the private address of the sending GVM (e.g., PA-A) as the source IP address, and the private address of the intended recipient GVM (e.g., PA-L) as the destination IP address. The baseline packet may be transmitted by the low level components of the GVM's networking software stack via a virtual network interface associated with the GVM. The VMC 215 at the virtualization host where the GVM runs (e.g., VMC 215A, which may comprise a hypervisor and/or an administrative domain operating system), which acts as the intermediary between the GVM and hardware devices 225A, may intercept such a baseline packet 244A and include the contents of the baseline packet within an encapsulation packet 245A. An encapsulation protocol may be employed in the VCS because the addresses of the GVMs may have to be mapped to the addresses of the virtualization hosts at which the GVMs are instantiated for the transmission of the packets along the routes needed to reach their destinations. For example, VH 230A has a network interface card with host IP address HA-A, and VH 230B has a network interface card with host IP address HA-B, while the respective GVMs established at the hosts 230 have different IP addresses from the range selected by the customer. The VMC 215A may determine the route over which the encapsulation packet 245A should be sent using IVN metadata 228A (which may comprise one or more routing tables, identifiers/addresses of gateways and other devices, etc.). The encapsulation packet 245A packet may indicate VH 230A's host IP address HA-A as the source, and the targeted VH 230B's host IP address HA-B as the destination (although in some cases the destination address indicated in the encapsulation packet may be an address assigned to an intermediary device at which the address of VH 130B may be available). The encapsulation packet 245A may be transmitted along the appropriate route towards VH 230B, e.g., a route which may include various intermediary devices 285 such as VCS edge routers, bridge network routers, tunneling intermediary devices, etc.

The encapsulation packet 245A may eventually be received at the network interface card (one of the hardware components 225B) of virtualization host 230B. The encapsulation packet 245A may be processed by the VMC 215B, which may extract the original baseline packet 244A and pass it on to the GVM 212L at which the destination application 211L runs. Packets generated at the application 211L and intended for application 211A may follow the reverse path to that used for baseline packet 244A. For example, a baseline packet 244B (generated at GVM 212L) with a source IP address PA-L and destination IP address PA-A may be intercepted and encapsulated by VMC 215B, a corresponding encapsulation packet 245B may be prepared and transmitted using intermediary devices 285. That encapsulation packet 245B, with a HA-B as its source address and HA-B (or an intermediary device address) as its destination address, may eventually reach VH 230A. At VH 230A, VMC 215A may extract baseline packet 244B and transfer it to GVM 212A. It is noted that depending on the details of the encapsulation protocol being used, additional packet headers and/or packet body elements may be included in the encapsulation packets 245A and 245B.

In the embodiment depicted in FIG. 2, the VMCs 215 may each include a metrics collector 227 (e.g., 227A and 227B). For each inbound and/or outbound packet handled by the VMC, a set of metrics may be collected in some embodiments, such as some combination of the source or destination IVN identifier, the source and destination IP addresses of the baseline packet, the source and destination IP addresses of the encapsulation packets, the size of the baseline and/or encapsulation packets, and/or a timestamp corresponding to the processing of the packet at the VMC. In other embodiments, the metrics may not necessarily be collected for each packet; instead, the metrics may only be collected for a subset of the packets (e.g., a randomly-selected subset of the packets, or a more deterministically selected subset such as every fourth packet). The packet-level metrics may be accumulated in local memory at the virtualization hosts in some embodiments, and accumulated metrics may be transmitted periodically by the metrics collectors 227 to a repository from which they can be accessed by VCS control plane components such as traffic analyzers. In some implementations the packet-level metrics may be transmitted at regular intervals (e.g., once every T seconds) to the repository, while in other cases the metrics may be accumulated until a threshold amount (e.g., J kilobytes) of metrics is available for transfer to the repository. In general, the operations of the metrics collectors and the repository may be designed to minimize the overhead associated with metrics collection and transfer, so that application performance is affected as little as possible. In at least one embodiment, some of the metrics collected for the packets processed at the VMCs may be used by entities other than the traffic analyzer—e.g., some metrics may be used for billing, for planning resource deployments of the VCS, and so on. In some embodiments, multiple encapsulation protocols may be employed for packets transmitted from a GVM at different devices, as described below with respect to FIG. 3.

Packet Flow Between GVMs and Publicly-Accessible Services

Figure 3:
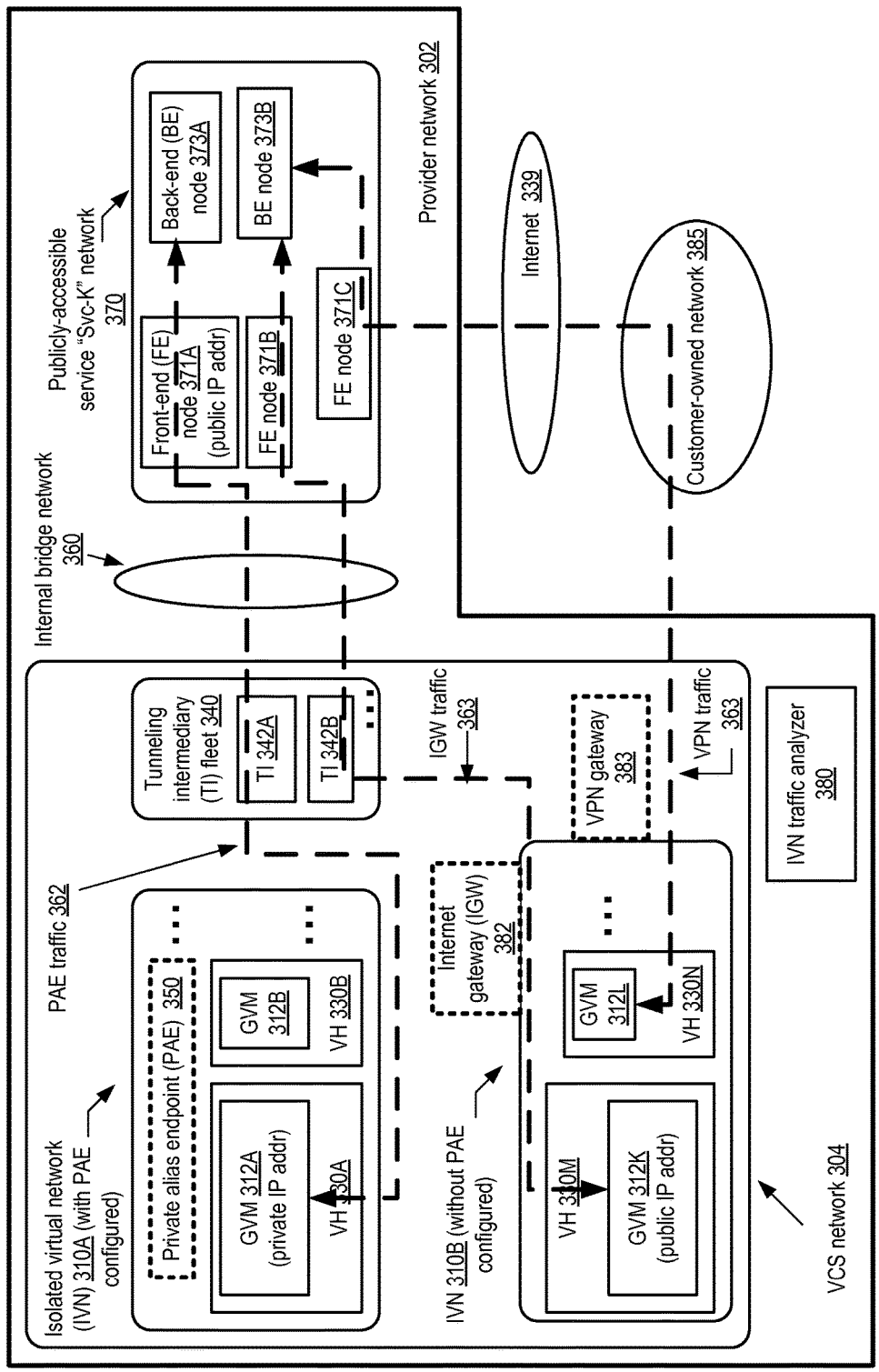
FIG. 3 illustrates an example provider network environment in which a private alias endpoint may be set up for traffic between an isolated virtual network and a publicly-accessible service of the provider network, according to at least some embodiments.

As mentioned earlier, at least some of the traffic associated with a GVM of an IVN may be directed to or from services (other than the VCS itself) implemented at the provider network. Some such services may advertise public IP addresses for service requests, so that, for example, service requests may be transmitted from client devices outside the provider network. These types of services may be referred to as publicly-accessible services. FIG. 3 illustrates an example provider network environment in which a private alias endpoint may be set up for traffic between an isolated virtual network and a publicly-accessible service of the provider network, according to at least some embodiments. As shown, a plurality of services are implemented at provider network 302, including a virtual computing service (VCS) and a publicly-accessible service Svc-K (i.e., a service that enables its clients to submit requests via publicly-advertised IP addresses or URIs) are implemented. Publicly-accessible service Svc-K may comprise, for example, a storage service providing web-service-based access to arbitrarily-sized storage objects, a non-relational database service, a relational database service, a notification service, a message queue service, a machine learning service, or any of a variety of other types of services. Each of these services may comprise a plurality of hosts, storage devices and other computing equipment that collectively form a logically separate portion of provider network, e.g., with its own administrative or control-plane layer. In FIG. 3, for example, the resources of the VCS are located within VCS network 304, while the resources of Svc-K are located within Svc-K network 370.

Within the VCS network 304, a number of different IVNs 310 such as IVN 310A and IVN 310B may be established on behalf of various clients. Each IVN may include one or more virtualization hosts (VHs) 330, such as VH 330A and 330B in IVN 310A, and VH 330M and 330N in IVN 310B. One or more GVMs 312 may be instantiated at each VH 330, such as GVM 312A at VH 330A, GVM 312B at VH 330B, GVM 312K at VH 330M, and GVM 312L at VH 130N. Each of the GVMs may be used for one or more client applications or application subcomponents.

In the embodiment shown in FIG. 3, service Svc-K comprises at least two layers of resources: front-end (FE) nodes 371 (such as load balancers and/or request routers) that are configured to receive incoming service requests and transmit outbound service responses, and back-end (BE) nodes 373 at which the service's logic for fulfilling the service requests is implemented. At least some of the FE nodes, such as FE nodes 371A, 371B, and 371C may have public IP addresses assigned to them, thus making Svc-K publicly accessible, e.g., to devices of the public Internet 339 and to Internet-connected devices at customer-owned networks such as network 385. In some embodiments a provider network operator may support the establishment of private alias endpoints for IVNs. A PAE may serve as a virtual endpoint representing a publicly-accessible service, and the PAE may be "private" in that its use does not require an assignment of a public network address to any entity within the IVN. PAEs may also be referred to as "virtual private endpoints" in some environments.

In FIG. 3, a private alias endpoint (PAE) 350 has been established at IVN 310A, e.g., to enable Svc-K-related packets to flow between GVM 312A (which has a private IP address that is not directly accessible from the public Internet) and the Svc1-K network 370, without requiring GVM 312A to have a public IP address assigned to it, and without requiring the traffic to pass through a customer-owned network 385 or links of the public Internet 339. A route table entry for IVN 310A may be set up in some embodiments to indicate that traffic originating at one or more subnets of IVN 310A (including the subnet in which GVM 312A is configured) and destined for Svc-K should be targeted to PAE 350. This route table entry, as well as other metadata such as a list of Svc-K's public IP addresses, may be available to a virtualization management component (VMC) (e.g., a hypervisor component) running on each of the virtualization hosts 330 of IVN 310A in at least some embodiments. An IVN control plane component may implement one or more programmatic interfaces (such as application programming interfaces (APIs), web-based consoles, command line tools, or graphical user interfaces and the like) enabling clients to request the creation of PAEs, the association of specific services with PAEs, the creation or modification of route table entries for an IVN, and so on.

The VMC at virtualization host 330A may intercept an outbound baseline packet generated at a GVM 312A and containing a service request directed to Svc-K. The service request may be formatted in accordance with any appropriate interface supported by Svc1, such as HTTP (HyperText Transfer Protocol), HTTPs (secure HTTP), XML (Extensible Markup Language), or the like. The baseline packet may indicate the private IP address of the GVM as the source and a public IP address of Svc-K as the destination. The VMC may generate a first encapsulation packet from the baseline packet in accordance with a first encapsulation protocol in the depicted embodiment. Within the first encapsulation packet, in some implementations the baseline packet may be included in the body, while one or more additional headers of the first encapsulation protocol may comprise (among other information) an indication that the packet contains PAE traffic. The first encapsulation packet may be transmitted, as indicated by the dashed arrow for PAE traffic 362, from the virtualization host 330A to a tunneling intermediary (TI) such as TI 342A of a fleet of tunneling intermediaries 340 in the depicted embodiment. The TI fleet 340 (which may comprise a plurality of computing devices set up as TIs, such as TI 342A, 342B, and so on) may have been established to allow traffic to flow between the VCS network 304 and a variety of other logically separated networks of the provider network, including Svc-K's network 370. Tunneling intermediaries may comprise special-purpose computing devices optimized for network-related processing in some embodiments. In other embodiments, a tunneling intermediary may comprise a process or thread of execution at a general-purpose computing device.

In at least some embodiments, upon receiving the first encapsulation packet, TI 342A may extract the contents of the baseline packet as well as the headers added by the VMC. In one embodiment, the TI 342A may utilize a mapping database associated with a particular tunneling protocol to generate different source and destination addresses from the baseline packet's source and destination addresses respectively. For example, in one implementation, the baseline packets source and destination IP addresses may be formatted according to IPv4 (version 4 of the Internet Protocol), and the TI 342A may replace them with longer, IPv6 (Internet Protocol version 6) addresses for a second encapsulation packet to be sent to the Svc1 network 370 via an internal bridge network 360. The internal bridge network 360 may be used as a path for cross-service traffic in the provider network, e.g., for traffic that is destined for publicly-accessible services from the virtual computing service. In some embodiments the internal bridge network 360 may be referred to as a border network and may also be used for traffic flowing between the public Internet and the virtual computing service. It is noted that the second encapsulation packet, generated at TI 342A from the first encapsulation packet, may not necessarily use a different version of the networking protocol in at least some embodiments than was used between the source VH 330A and the TI 342A.

The second encapsulation packet, generated at TI 342A, may be transmitted via the bridge network 360 to a front-end node 371 (e.g., 371A) of the destination service Svc-K. The front-end node 371 may be able to perform de-capsulation in accordance with the tunneling protocol to extract contents of the baseline packet (including the source GVM's private IP address), as well as the identifier of the source IVN (e.g., IVN 310A) and/or the identifier of the PAE (e.g., PAE 350) used for routing. In at least some embodiments, the identification of the PAE and/or the source IVN may enable Svc-K nodes to distinguish between service requests from different GVMs with the same source private IP address. The service request indicated in the baseline packet may be passed on to a back-end node 373 (e.g., 373A) for processing. After the request has been processed, a baseline response packet may be generated at the back-end node, encapsulated in accordance with the tunneling protocol, and transmitted in the reverse direction back towards the source of the request (GVM 312A) via PAE traffic path 362. A TI 342 (e.g., either TI 342A or a different TI) may receive the encapsulated response via the internal bridge network 360, generate a modified encapsulation version using the first encapsulation protocol, and transmit it to the VMC at VH 330A. The VMC may extract the baseline response packet and provide it to the source GVM 312A.

It is noted that while two different encapsulation protocols have been discussed above, in some embodiments only a single encapsulation protocol may be required or used to facilitate traffic between GVMs and publicly accessible services. For example, in one such embodiment, VMCs may be capable of implementing the tunneling protocol that is used for traffic over the internal bridge network, and thus the VMCs themselves may act as tunneling intermediaries. In such an embodiment, a VMC may intercept packets with the publicly-accessible service associated with a PAE 350 as the destination, generate an encapsulated packet that contains an encoding of the source IVN and/or the PAE, and transmit the encapsulated packet on to a bridge network device.

Instead of using a PAE as a target in a route table entry for traffic directed towards Svc-K, two other alternatives with respect to routing traffic between IVNs and Svc-K may be available, both of which are also illustrated in FIG. 3. In one approach, a client on whose behalf IVN 310B is set up may decide to establish an Internet gateway 382 for their IVN and/or to assign a public IP address (which can be accessed from the public Internet) to one of their GVMs such as GVM 312K. In such a scenario, baseline packets containing Svc-K requests generated at GVM 312K may be transmitted to Svc-K nodes (e.g., FE node 371B) without using the kind of tunneling protocol described above, e.g., via a path similar to path 363 indicated for Internet gateway (IGW) traffic. In some cases, the path used for traffic originating at a public IP address may comprise links 339 of the public Internet.

In a second alternative to the use of PAEs, a client may establish a VPN (Virtual Private Network) gateway 383 to provide secure connectivity between an IVN 310B and a customer-owned network 385. Packets that are directed to Svc-K from a GVM such as 312L may first be sent to the customer-owned network 385, and then sent (e.g., via public Internet links 339) to Svc-K nodes (such as FE node 371C). It is noted that an IVN such as 310B that has a VPN gateway 385 established need not utilize public IP addresses and need not have an Internet gateway 382 set up. In the embodiment illustrated in FIG. 3, a traffic analyzer 380 implemented as part of the VCS control plane may collect packet-level metrics from the VMCs at the virtualization hosts, and/or from tunneling intermediaries. IVN metadata indicating the establishment of Internet gateways 382, VPN gateways 383, and/or PAEs 350 may also be accessed by the traffic analyzer, and used together with the packet-level metrics to generate traffic distribution analyses, traffic predictions, and/or recommendations for configuration changes (e.g., a recommendation to establish a PAE instead of using a VPN connection may be generated based on the analysis of the collected metrics).

Traffic Analyzer Inputs

Figure 4:
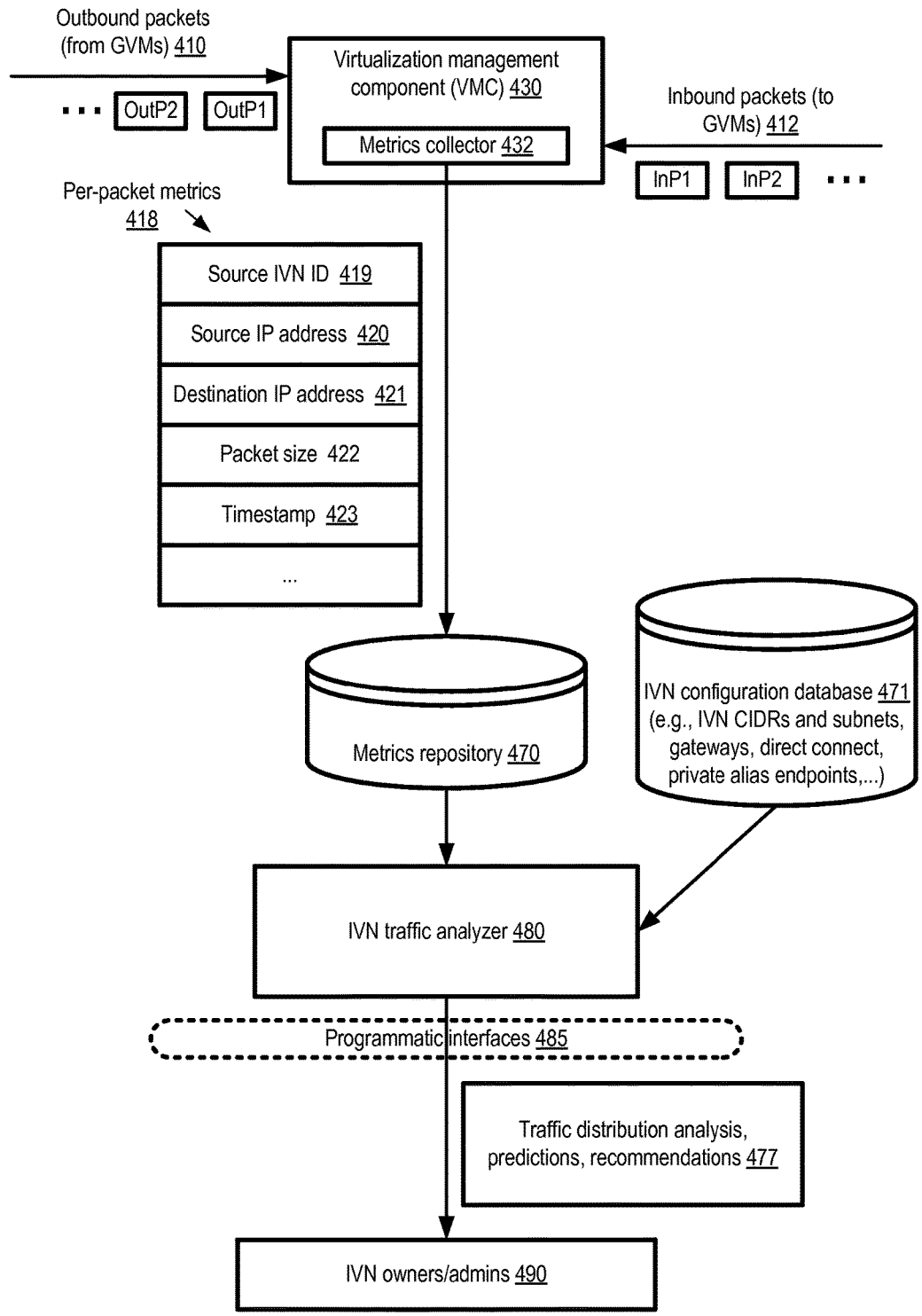
FIG. 4 illustrates an overview of the kinds of information which may be collected by a traffic analyzer from various components of a provider network, according to at least some embodiments.

FIG. 4 illustrates an overview of the kinds of information which may be collected by a traffic analyzer from various components of a provider network, according to at least some embodiments. In the depicted embodiment, a metrics collector 432 of a virtualization management component 430 at a virtualization host may capture a respective set of per-packet metrics 418 with respect to each inbound packet 412 (packets directed to a GVM of the virtualization host, such as InP1, InP2, etc.) and with respect to each outbound packet 410 (packets generated at the GVMs of the virtualization host, such as OutP1, OutP2, etc.). In other embodiments, instead of collecting metrics for packets flowing in both directions, metrics may be collected for outbound packets only, or for inbound packets only. In one embodiment, metrics may be collected for selected packets in one or both directions, rather than for all packets. The per-packet metrics 418 may include, for example, an identifier 419 of a source IVN from which the packet originates (which may be indicated in an encapsulation header added by the sender VMC, and which may only be collected for packets that do originate at an IVN), a source IP address 420 (e.g., a private or public IP address assigned to a GVM at which the packet originates, to a service front-end node, or to an endpoint outside the provider network), a destination IP address 421 (e.g., a private or public IP address assigned to a GVM to which the packet is directed, to a service front-end node, or to an endpoint outside the provider network), a packet size 422 (e.g., the size of the baseline packet), and a timestamp 423 (e.g., the wall clock time of the virtualization host at millisecond granularity, or some other time measure). Other metrics may also be collected in some embodiments, such as the destination IVN ID if available, a source or destination service identifier if available, and so on.

Accumulated metrics 418 may be transmitted periodically to a repository 470 in the depicted embodiment, e.g., using a control plane network path which has minimal or no overlap with the paths used for client application's traffic (the inbound packets 412 and outbound packets 410). The metrics repository 470 may be implemented at one or more computing and/or storage devices of the VCS control plane in the depicted embodiment, isolated from the client application traffic and therefore avoiding interference with the client application. The IVN traffic analyzer 480 (which may also be implemented as a control plane component of the VCS) may analyze the metrics stored in the repository 470, together with contents of IVN configuration database 471. The IVN configuration database may, for example, indicate the address ranges (e.g., expressed in CIDR notation) selected by clients for various IVNs, gateway information (e.g., for Internet gateways configured at the IVNs, or virtual private gateways used for VPN connections or dedicated direct physical links of the kind discussed above), private alias endpoint information, and so on). In some embodiments, the IVN configuration database may be spread among a plurality of control plane components—that is, the IVN configuration information may be stored in a distributed fashion, and the traffic analyzer may have to obtain respective subsets of the configuration information from the different components of the database. Using the IVN configuration data and the collected packet-level metrics, the traffic analyzer 480 may be able to identify the categories of endpoints into which the traffic of a given IVN should be distributed, and then to compute the actual amounts of traffic for the different categories per selected time intervals.

The IVN traffic analyzer 480 may implement a set of programmatic interfaces 485, such as web-based consoles, application programming interfaces (APIs), command-line tools, and/or graphical user interfaces in various embodiments. Clients of the traffic analyzer, such as IVN owners and administrators, may submit programmatic requests using the interfaces 485, and receive traffic distribution analyses, traffic trend predictions, and/or configuration recommendations 477 via the interfaces.

Predictions and Recommendations Overview

Figure 5:
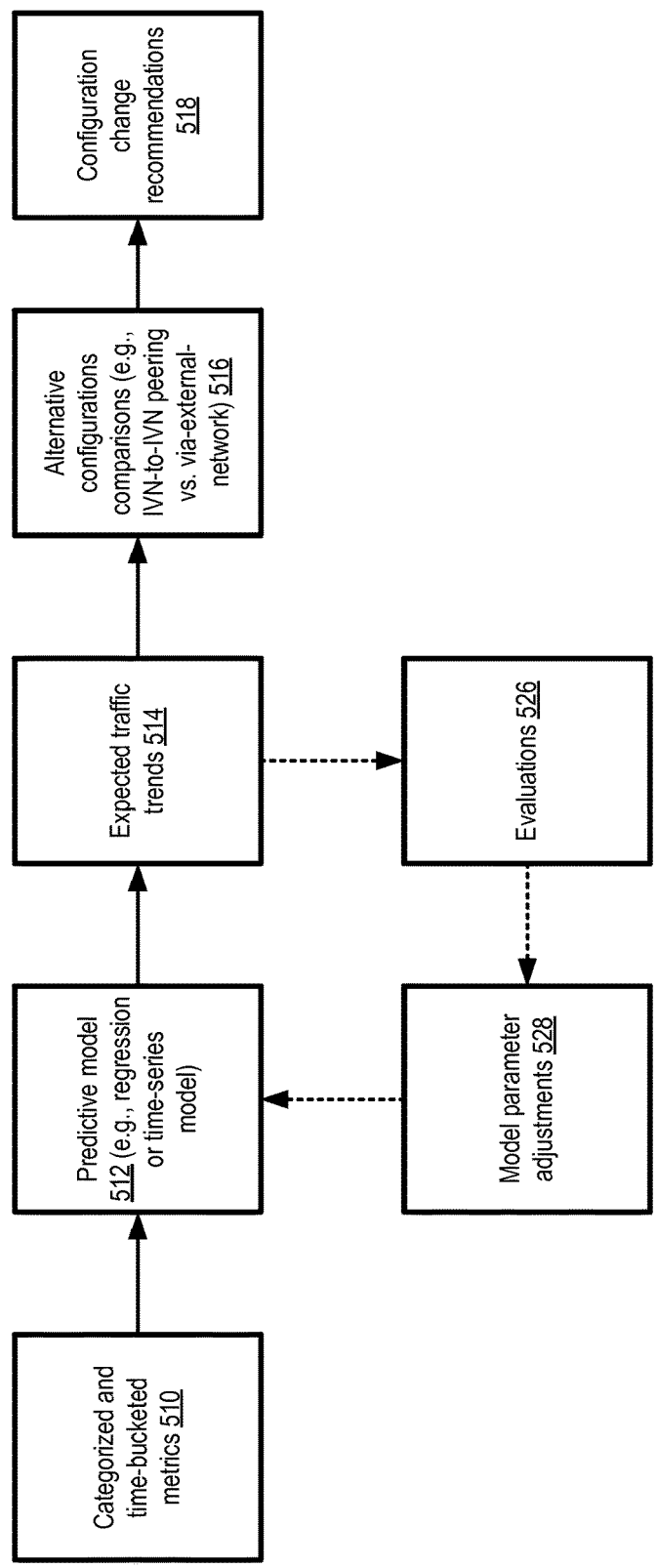
FIG. 5 illustrates an overview of the process of generating traffic predictions and recommendations with respect to various isolated virtual networks, according to at least some embodiments.

As mentioned earlier, in some embodiments, an IVN traffic analyzer may provide predictions of traffic trends between a given IVN and various categories of communication endpoints. FIG. 5 illustrates an overview of the process of generating traffic predictions and recommendations with respect to various isolated virtual networks, according to at least some embodiments. The packet-level metrics 510 (e.g., categorized and aggregated or bucketed for desired time intervals, such as per-minute or per-second buckets) may be provided as input observations of a predictive model 512. Any of a number of different types of predictive models may be employed in different embodiments, such as linear regression models, logistic regression models, time series models, and the like.

The predictive models may provide expected traffic trends 514 (e.g., for each of the various endpoint categories) as output. In some embodiments, predictions and trends may be generated for several types of measures—e.g., for peak traffic rates at a per-second granularity as well as for average traffic rates at a per-hour granularity. Using the predicted trends, the IVN traffic analyzer may generate comparisons 516 of various configuration alternatives—e.g., to determine whether better overall performance and/or utilization levels would be achieved if an IVN-to-IVN peering connection were to be set up instead of using an external network as an intermediary for traffic between the IVNs. In at least some embodiments, the traffic analyzer may also have access to pricing information regarding the different configuration options, and may be able to use pricing as a factor in its comparisons. If a modified networking configuration for the IVN appears to be advisable, the traffic analyzer may prepare and transmit a configuration change recommendation 518 to the owner or administrator of the IVN.

As more per-packet metrics are collected over time, it may become possible for the predictions to be evaluated with respect to the actual measured traffic. Depending on the extent of the errors in the predictions, various model parameters (such as one or more coefficients of the regression models) may be adjusted to improve the accuracy of the predictions. The evaluations 526 and corresponding model parameter adjustments 528 may be performed iteratively in some embodiments, in an effort to ensure that the quality of the predictions keeps improving over time.

Interactions with Traffic Analyzer Clients

Figure 6:
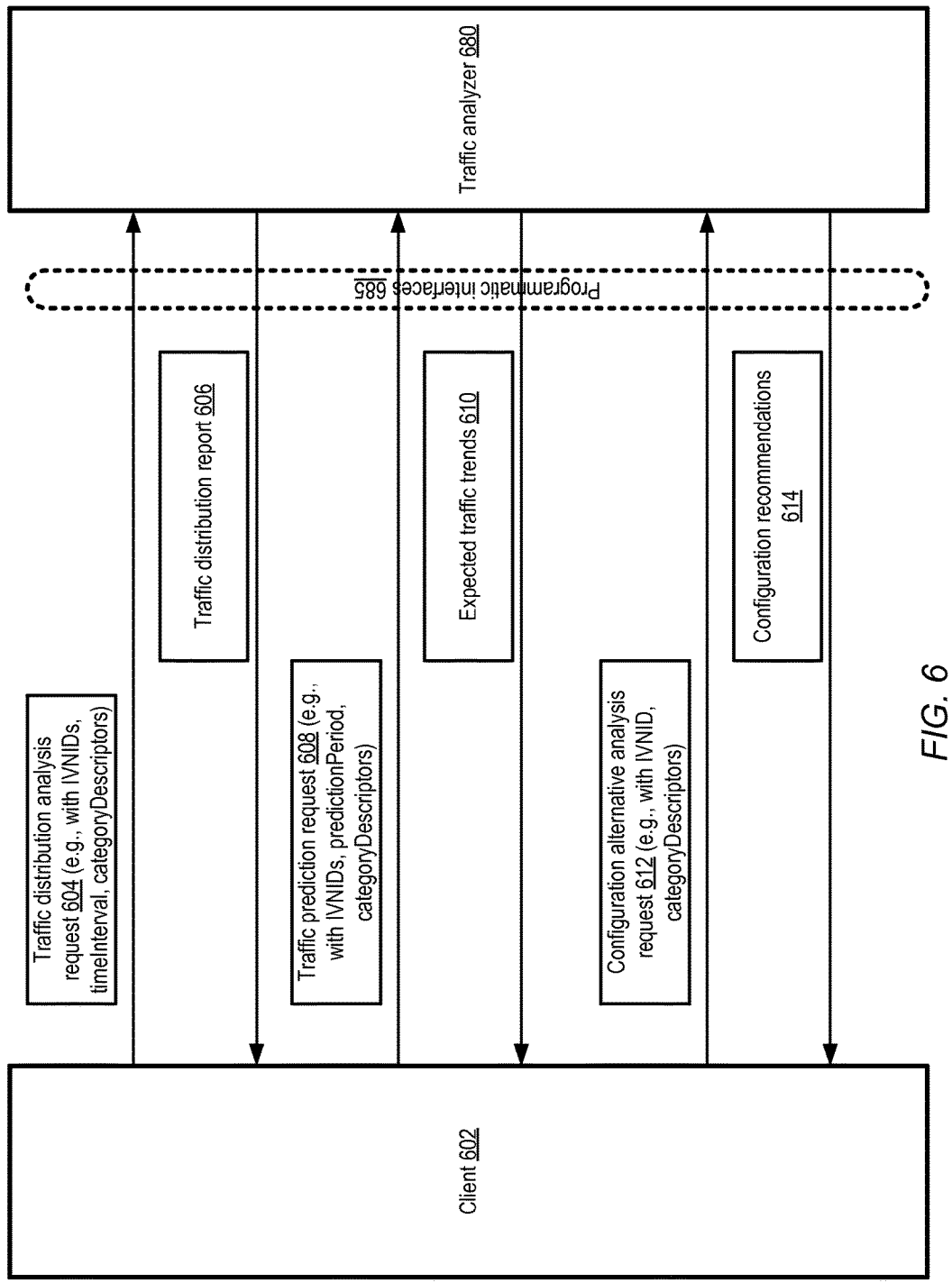
FIG. 6 illustrates examples of interactions between clients and a traffic analyzer, according to at least some embodiments.

FIG. 6 illustrates examples of interactions between clients and a traffic analyzer, according to at least some embodiments. A client 602 such as an owner or administrator of an IVN may use programmatic interfaces 685 implemented by the traffic analyzer 680 to submit several different types of requests in the depicted embodiment. A traffic distribution analysis request 604 may indicate, for example, identifiers (IVNIDs) of one or more specific IVNs whose traffic is to be categorized, a time interval, and/or one or more category descriptors indicating the endpoint categories of interest. For example, a traffic distribution analysis request may comprise the logical equivalent of the query "how much of the inbound and outbound traffic of IVN-J in the time interval T was between IVN-J and IVN-K, how much was between IVN-J and Service-S, and how much was between IVN-J and the Internet"? The response provided to the request 604 may include a traffic distribution report for the specified categories. In some embodiments, the time period and/or the categories may not have to be indicated in a traffic distribution request 604; instead, the traffic analyzer 680 may choose a default time interval and identify the categories using the metrics it has available. In one embodiment, a client need not even specify the IVN identifier(s) for which traffic distribution is to be indicated—instead, for example, the traffic analyzer may use the IVN configuration database to identify which IVNs belong to the client's account, and produce traffic categorization reports for those IVNs. The client 602 may also indicate various other filters or parameters for the traffic categorization request in some embodiments—e.g., a direction (inbound or outbound) of the traffic to be analyzed may be indicated, or whether peak or average traffic rates are to be provided may be indicated.

Clients may submit traffic prediction requests 608, e.g., indicating the identifiers of the IVNs of interest, the time periods for which the predictions are to be obtained, and the categories of traffic for which predictions are to be provided. As discussed above, the traffic analyzer may use a predictive model to generate expected traffic trends 610 provided in response to such requests 608. In some embodiments, a client 602 may submit requests 612 for configuration alternative analyses—e.g., the logical equivalent of a query similar to "given the trends in expected traffic at IVN-J, should I change any of IVN-J's connectivity configuration settings, and if so, what changes should I make?" In some embodiments such requests may specify the IVN identifiers for which potential recommendations are requested, and/or the categories of traffic for which recommendations are requested. In at least one embodiment, budgeting goals may be included in the recommendation requests 612, since different ways of routing IVN traffic may have different billing costs associated with them. The traffic analyzer may compare alternatives to the specified IVN's current configuration settings with respect to the categories, and provide a configuration recommendation 614. The recommendation may indicate whether a change to the current configuration would be beneficial, and the particular change or changes to make (if any), such as scaling up the data plane components of existing pathways, establishment/configuration of new pathways, etc. In some cases the traffic analyzer may recommend that the current configuration is adequate and need not be changed.

Example Web-Based Interfaces

Figure 7:
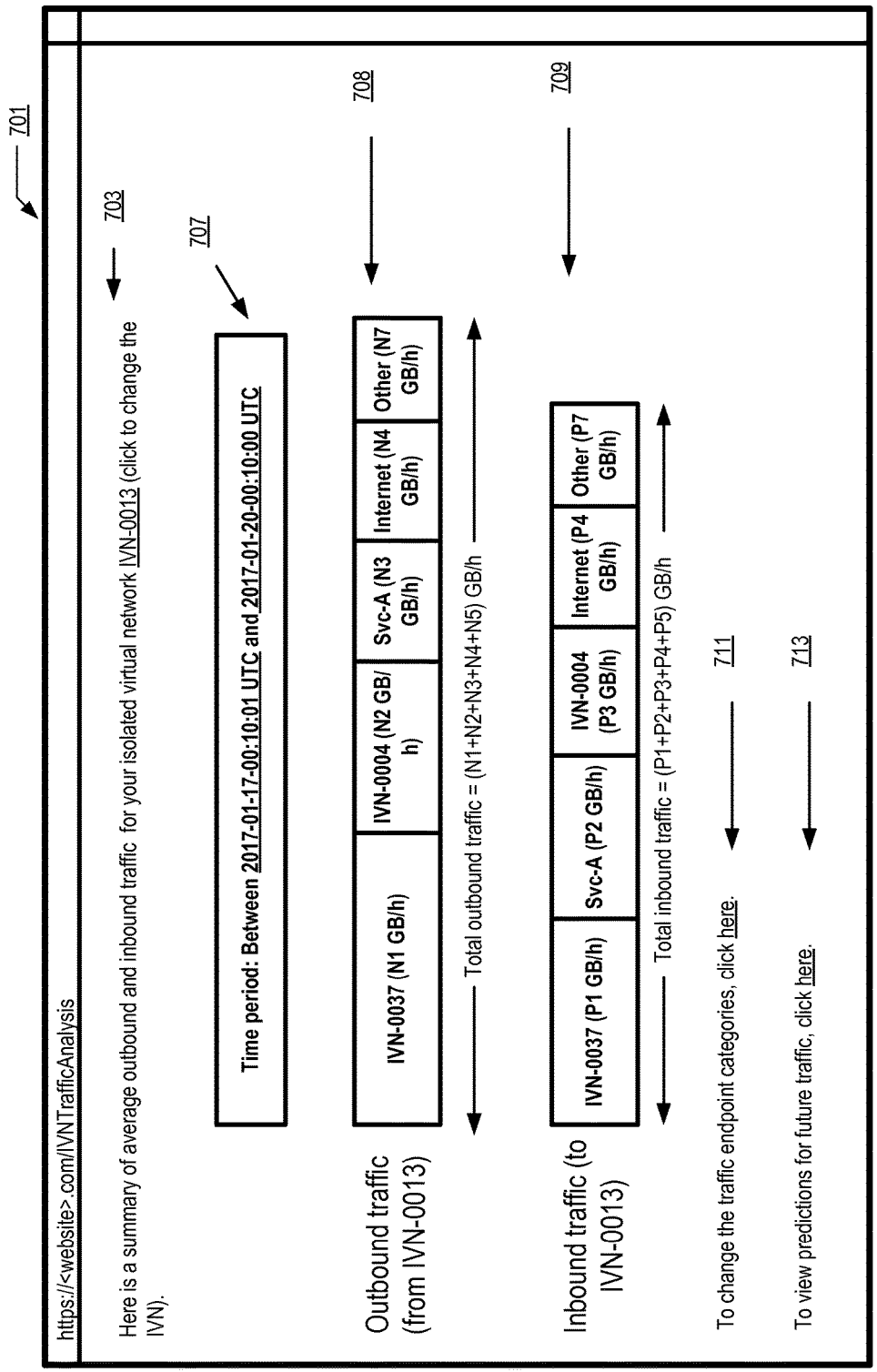
FIG. 7 illustrates an example web-based interface which may be implemented by a traffic analyzer to provide traffic distribution analyses with respect to an isolated virtual network, according to at least some embodiments.

FIG. 7 illustrates an example web-based interface which may be implemented by a traffic analyzer to provide traffic distribution analyses with respect to an isolated virtual network, according to at least some embodiments. As shown, web page 701 includes a message area 703 and several regions comprising information regarding IVN network traffic with various categories of endpoints. Within message area 703, the identifier of the IVN (IVN-0013) whose traffic distribution is reported is indicated. Clients may click on the link indicated in message area 702 to change the IVN for which data is being displayed.

The time period for which the traffic metrics are being provided is indicated in element 707 of page 701. The respective rates of outbound traffic (in gigabytes per hour) sent from IVN-0013 to each of four destination endpoint categories, as well as a destination endpoint category ("Other") representing the remainder of the traffic, is shown in element 708. In the example scenario depicted in FIG. 7, a destination IVN category representing a different IVN (IVN-0037) has the highest amount of outbound traffic from IVN-0013, followed by IVN-0004, a service Svc-A, and the Internet. With respect to inbound traffic, the highest traffic rates during the time period indicated in element 707 were from IVN-0037, Svc-A, IVN-0004, and the Internet, in that order, as shown in element 709. A client of the traffic analyzer may modify the manner in which the data is categorized (e.g., by requesting that more than five broad categories be shown, or by requesting some other breakdown of the traffic measurements) using the link shown in element 711. To view predictions of traffic trends, a client may click on a link in element 713.

Figure 8:
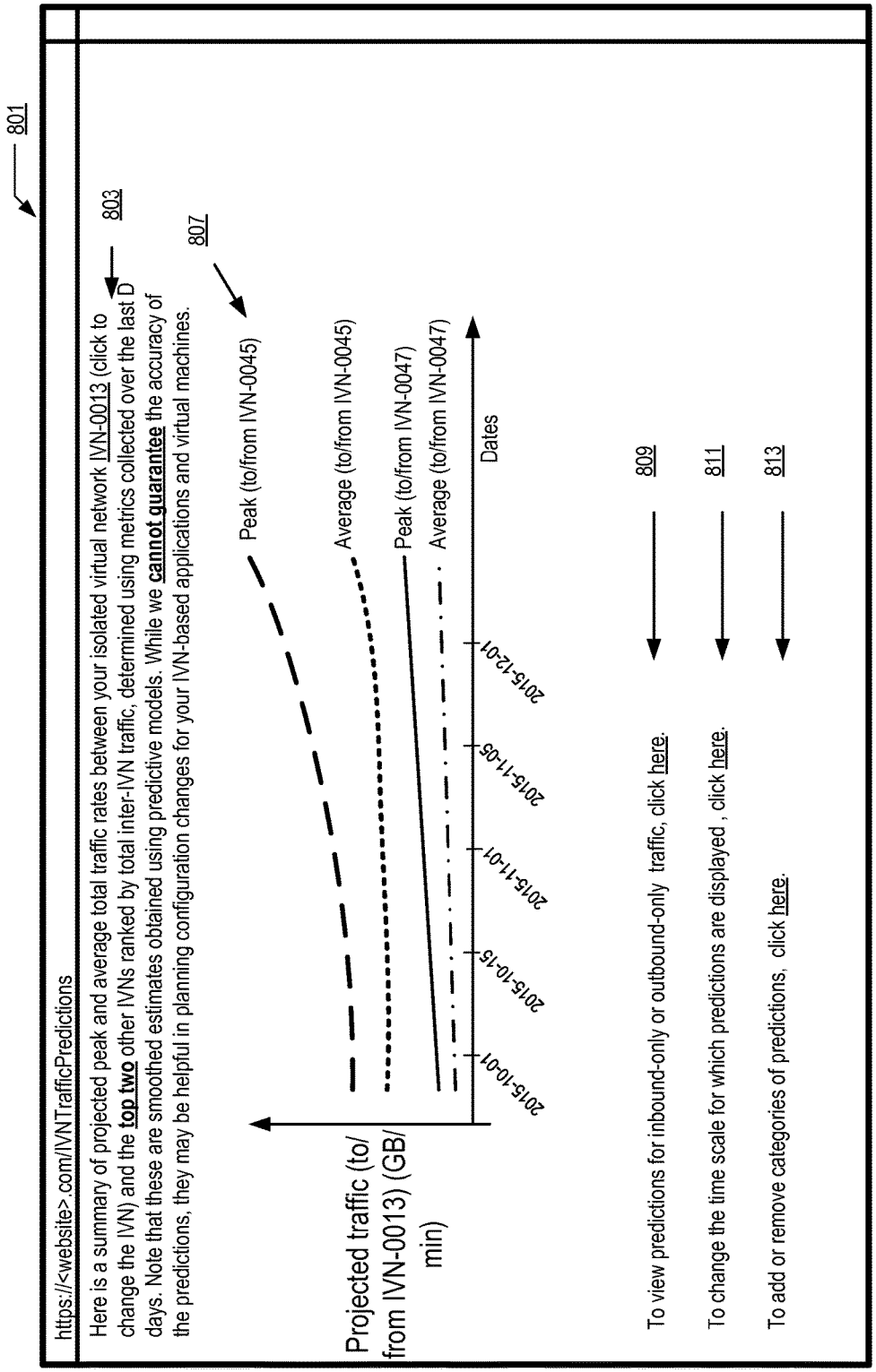
FIG. 8 illustrates an example web-based interface which may be implemented by a traffic analyzer to provide traffic predictions with respect to an isolated virtual network, according to at least some embodiments.

FIG. 8 illustrates an example web-based interface which may be implemented by a traffic analyzer to provide traffic predictions with respect to an isolated virtual network, according to at least some embodiments. Web page 801 includes a message area 803 and a graph 807 of traffic predictions. In the message area 803, an overview of the predictions that are displayed in graph 807 is provided, together with a disclaimer regarding the accuracy of the predictions. A client of the traffic analyzer may modify the IVN for which predictions are displayed by clicking on a link in message area 803.

In the example scenario depicted in FIG. 8, trends for two traffic metrics each for two endpoint categories are shown. Peak and average traffic rates expected over several months (as indicated by the dates on the X-axis) between IVN-0013 and IVN-0045, and between IVN-0013 and IVN-0047, are shown. The smoothed curves in the graph represent the combination of inbound and outbound traffic. To view the predictions for inbound traffic only or outbound traffic only, a client may use control 809. To change the time scale of the displayed predictions, control 811 may be used, and to modify the set of endpoint categories for which expected trends are shown, control 813 may be used. It is noted that similar information to that shown in FIG. 7 or FIG. 8 may be provided via other types of programmatic interfaces supported by the VCS control plane in some embodiments— e.g., via APIs, command-line tools, and/or graphical user interfaces which are not necessarily web-based.

Methods for IVN Traffic Analysis

Figure 9:
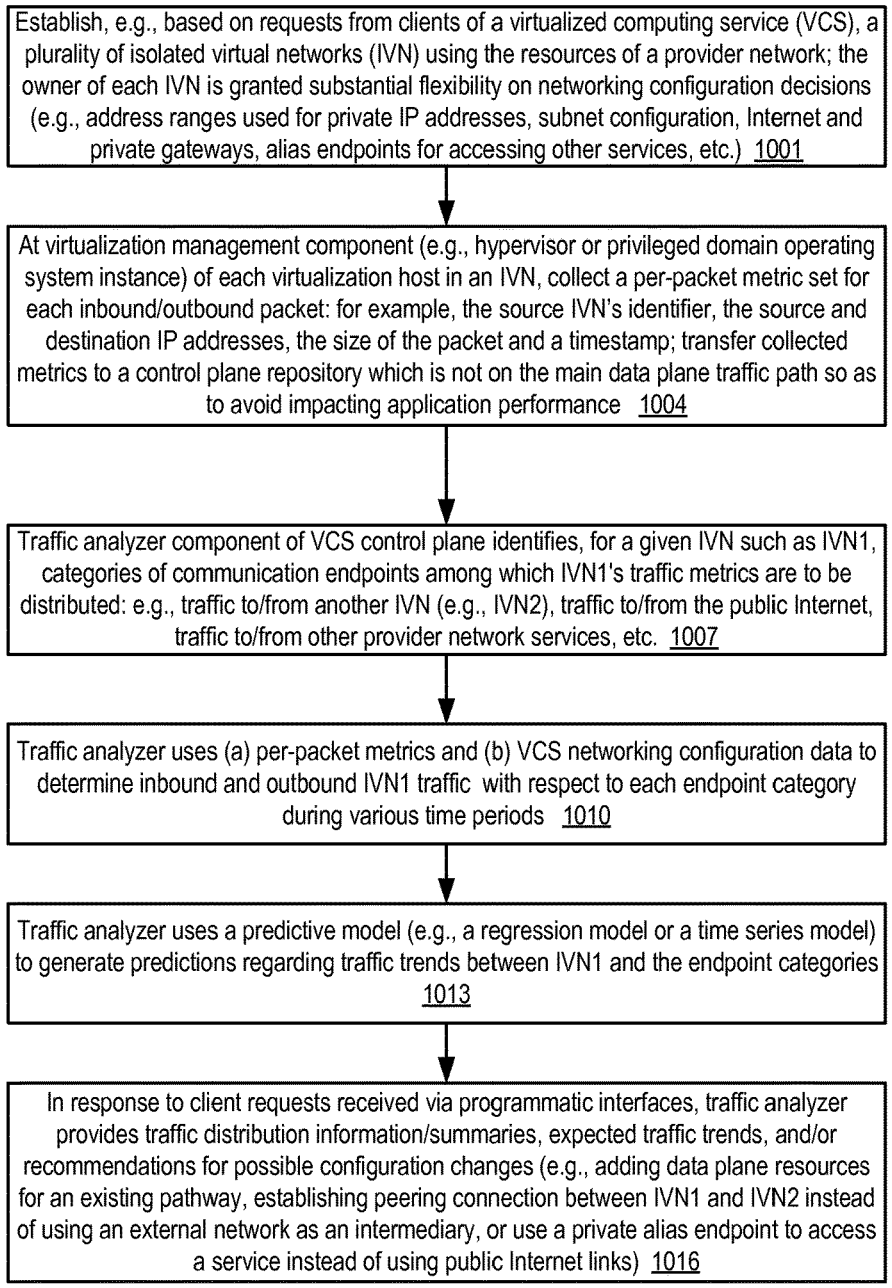
FIG. 9 is a flow diagram illustrating aspects of operations that may be performed by a traffic analyzer associated with isolated virtual networks of a virtual computing service, according to at least some embodiments.

FIG. 9 is a flow diagram illustrating aspects of operations that may be performed by a traffic analyzer associated with isolated virtual networks of a virtual computing service, according to at least some embodiments. As shown in element 901, a plurality of isolated virtual networks (IVNs) may be established on behalf of clients of a virtual computing service (VCS) of a provider network. Each IVN may comprise a set of virtualized and/or physical resources, such as various guest virtual machines (GVMs) launched on virtualization hosts. The set of resources of a given IVN may change over time; for example, new GVMs may be added at the request of the client, or existing GVMs may be taken offline. The client for whom the IVN is established may be granted substantial flexibility in terms of networking configuration of the IVN resources and the manner in which connectivity is established between the IVN's resources and endpoints outside the IVN. For example, the IVN owner may choose a range of IP addresses which can be assigned to GVMs of the IVN, independently of whether the address range overlaps with the addresses assigned to resources outside the IVN; the IVN owner may establish subnets, set up routing table entries, establish Internet gateways, private virtual gateways, peering connections to other IVNs, private alias endpoints to enable access from the IVN to publicly-accessible services implemented at the provider network, and so on.

Each virtualization host of the VCS may comprise one or more virtualization management components (VMCs), such as a hypervisor and/or an operating system running in an administrative domain, which collectively act as intermediaries between the GVMs of the host and the hardware devices of the host. As part of their role as intermediaries, the VMCs may implement an encapsulation protocol on network packets generated at (or directed to) the GVMs as described earlier. As shown in element 1004, the VMCs may collect a set of metrics for each inbound and/or outbound network packet. The metrics collected for a given packet may include, for example, an IVN identifier of the source IVN at which the packet originated (if the packet did originate at an IVN), the source and destination IP addresses (at least one of which may be a GVM IP address), the size of the packet, and a timestamp. The collected metrics may be transmitted (e.g., in chunks accumulated over some time period or for some number of packets) to a repository which forms part of the control plane or administrative components of the VCS. The collection and transfer of the metrics may be orchestrated so as to cause minimal interference with the client applications on whose behalf the packets are transmitted—e.g., network paths which are not used for the application-related packets may be used, and storage devices which are not involved in application-related workflows may be used for the repository.

A traffic analyzer component of the VCS control plane may identify, for any given IVN such as IVN1, a group of endpoint categories, such that the traffic being transmitted to or from IVN1 can be placed into one of the categories (element 1007). An endpoint category may include, for example, the addresses of a different IVN such as IVN2, the addresses associated with a different network-accessible service implemented at the provider network (e.g., a database service or a storage service), addresses at a customer-owned network, or addresses of the public Internet. The categories may be identified by the traffic analyzer based on any of various factors in different embodiments—e.g., based on input received programmatically from clients such as IVN owners, based on analysis of the routing tables or other configuration metadata associated with an IVN, and/or based on the collected packet-level metrics stored in the repository.

For each endpoint category identified for an IVN, the traffic analyzer may determine the inbound and/or outbound traffic with respect to that IVN during various time periods of interest (element 1010), e.g., using the packet-level metrics and an IVN configuration database. The granularity of the time periods for which inbound and outbound traffic measures (e.g., peak traffic or average traffic) are determined may be selected by the traffic analyzer in some implementations, e.g., based on available per-packet metrics and/or based on client requests. In at least some embodiments, the traffic analyzer may feed the aggregated and categorized traffic measures to a predictive model (e.g., a regression model or a time series model), and obtain predictions for the expected trends in future levels of traffic for various categories (element 1013). The traffic analyzer may implement a number of programmatic interfaces for interactions with its clients, such as one or more web pages or web sites, APIs, command-line tools, and the like. In response to requests received via such interfaces (element 1016), the traffic analyzer may provide summaries or reports of the traffic distribution of an IVN with respect to the identified endpoint categories for the IVN, expected traffic trends generated using the model, and/or proactive recommendations for configuration changes (such as deploying additional data plane resources for a pathway which has already been configured, transitioning to a peering connection between IVNs instead of using an external network as an intermediary, or switching to or from a private alias endpoint instead of routing service requests to a given service via public IP addresses).

It is noted that in various embodiments, some of the operations shown in the flow diagram of FIG. 9 may be implemented in a different order than that shown in the figure, or may be performed in parallel rather than sequentially. Additionally, some of the operations shown in the flow diagram may not be required in one or more implementations.

Use Cases

The techniques and algorithms described above, of categorizing and forecasting traffic associated with isolated virtual networks of a provider network may be beneficial in a number of environments. Many large virtualized computing service customers may have numerous IVNs configured, and may have established connectivity between a given IVN and various other sets of endpoints (such as external or customer-owned networks, other provider network services, and other IVNs) using a variety of technologies including dedicated direct physical links, VPNs and the like. The multiplicity of pathways available may make it hard to obtain a clear view of the manner in which traffic flows between the different endpoint categories. In some cases, for example, it may not be straightforward for a customer to tell how much of the traffic emanating from a given IVN and directed to an external network is actually terminating at devices of the external network, and how much of that traffic is actually being sent back to other provider network resources such as other IVNs or other services. A traffic analyzer of the kind described here may be able to utilize packet-level metrics collected at virtualization hosts and IVN configuration metadata to provide easy-to-understand summaries or reports of the distribution of IVN traffic over desired time intervals. Furthermore, the traffic analyzer may be able to forecast future traffic levels with respect to different categories of endpoints, which may enable proactive configuration changes to be made.

Illustrative Computer System

Figure 10:
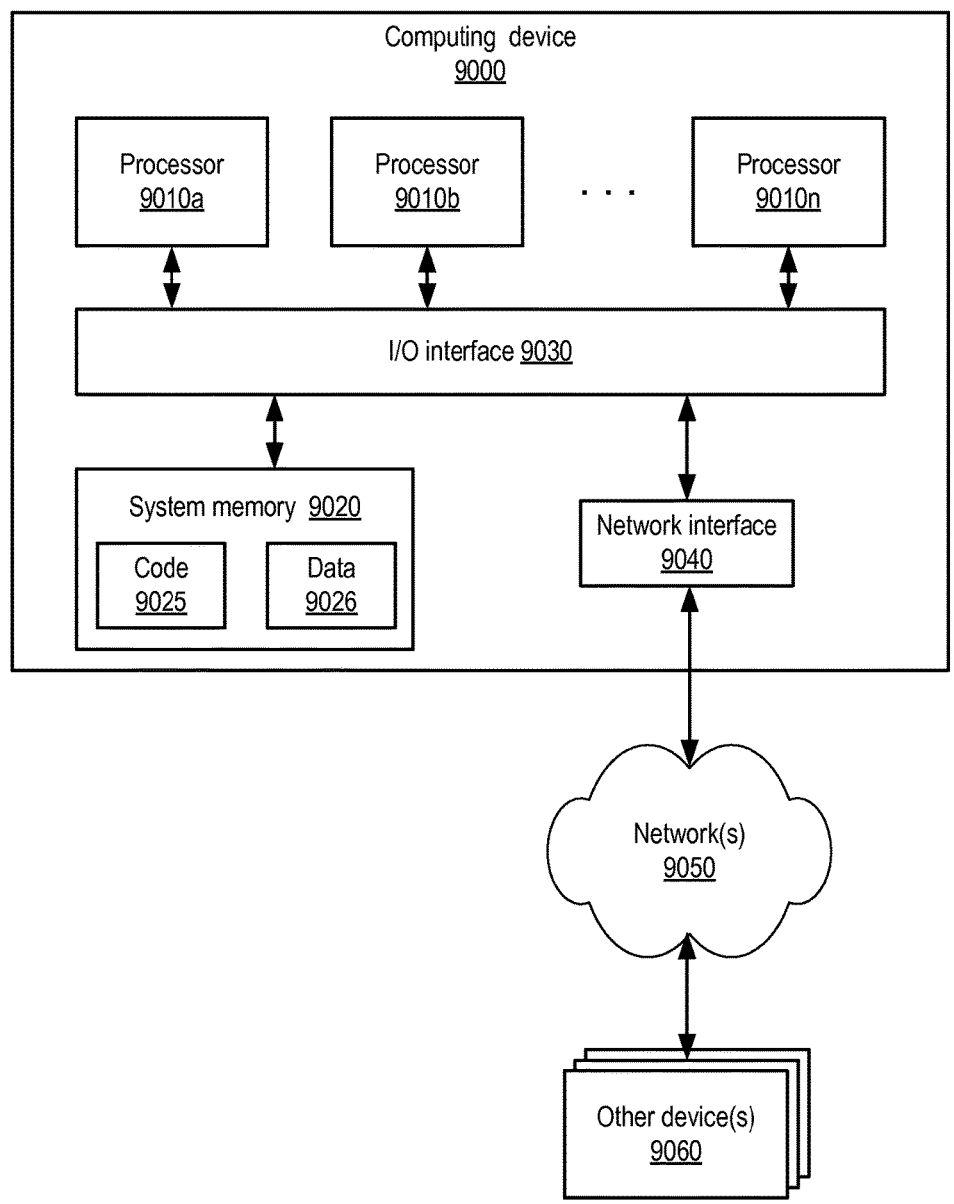
FIG. 10 is a block diagram illustrating an example computing device that may be used in at least some embodiments.

In at least some embodiments, a server that implements one or more of the techniques described above for traffic analysis, including traffic analyzers, predictive models, virtualization hosts with metric collectors, and/or various other elements of the control and data planes of services of the provider network, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD- ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices, of a provider network, comprising respective hardware processors and memory to implement a traffic analyzer; and
one or more virtualization hosts of a first isolated virtual network of the provider network, including a first virtualization host comprising a virtualization management component and a guest virtual machine, wherein the first isolated virtual network comprises a particular configuration of resources, pathways, and connections;
wherein the virtualization management component is configured to:
collect a first metric set associated with a network packet generated at the guest virtual machine, wherein the first metric set includes one or more of: (a) an identifier of the first isolated virtual network, (b) a source network address, (c) a destination network address, (d) a timestamp, or (e) a packet size; and
wherein the traffic analyzer is configured to:
identify a plurality of endpoint categories with respect to network traffic generated at the first isolated virtual network, including a first endpoint category which includes a second isolated virtual network of the provider, and a second endpoint category which includes at least one network address outside the first isolated virtual network and the second isolated virtual network;
determine, based at least in part on an analysis of a plurality of metric sets collected at the one or more virtualization hosts, including the first metric set, and based at least in part on the identification of the plurality of endpoint categories, (a) a first amount of data transmitted between the first isolated virtual network and the first endpoint category during a selected time interval, wherein the first endpoint category does not include the first isolated virtual network, and (b) a second amount of data transmitted between the first isolated virtual network and the second endpoint category, wherein the second endpoint category does not include the first isolated virtual network or the second isolated virtual network;
estimate, using a predictive model to which the first amount of data is provided as input, an expected trend of traffic between the first isolated virtual network and the first endpoint category; and
generate a change recommendation for the particular configuration of resources, pathways, and connections of the first isolated virtual network based at least in part on the expected trend.

2. The system as recited in claim 1, wherein the first isolated virtual network is established on behalf of a first client, wherein the destination network address is in an address range of the second isolated virtual network, further comprising one or more routing devices router of the provider network configured to:
select a route for the network packet, wherein the route includes a dedicated private network link established between the first isolated virtual network and a client network of the first client.

3. The system as recited in claim 1, wherein the traffic analyzer is configured to:
receive, via a programmatic interface, a request for a traffic distribution report of the first isolated virtual network; and
transmit, in response to the request, an indication of at least the first amount of data.

4. The system as recited in claim 1, wherein the first and second isolated virtual networks are implemented at a virtualized computing service of the provider network, wherein the second endpoint category comprising an address assigned to one of: (a) a storage service of the provider network, or (b) a database service of the provider network.

5. The system as recited in claim 1, wherein the traffic analyzer is configured to identify at least the first endpoint category based at least in part on a programmatic indication received from a client.

6. A method, comprising:
collecting, at a virtualization management component of a first host of a virtualized computing service, a first metric set associated with a network packet generated at a guest virtual machine of a first isolated virtual network of the virtualized computing service, wherein the first isolated virtual network comprises a particular configuration of resources, pathways, and connections, wherein the guest virtual machine is implemented at the first host, and wherein the first metric set includes one or more of: (a) a source network address, (b) a destination network address, or (c) a packet size;
identifying, at a control plane component executing on one or more computing devices of the virtualized computing service, a plurality of endpoint categories with respect to network traffic of the first isolated virtual network, including a first endpoint category which includes a second isolated virtual network of the virtualized computing service, and a second endpoint category does not include either the first isolated virtual network or the second isolated virtual network;
determining, at the control plane component based at least in part on an analysis of a plurality of metric sets including the first metric set, and based at least in part on the identified plurality of endpoint categories, (a) a first amount of data transmitted between the first isolated virtual network and the first endpoint category during a selected time interval, wherein the first endpoint category does not include the first isolated virtual network, and (b) a second amount of data transmitted between the first isolated virtual network and the second endpoint category;
storing, by the control plane component, a result of a predictive model to which the first amount of data is provided as input, wherein the result comprises an indication of an expected future level of traffic between the first isolated virtual network and the first endpoint category; and generating a change recommendation for the particular configuration of resources, pathways, and connections of the first isolated virtual network based at least in part on the result of the predictive model.

7. The method as recited in claim 6, further comprising:
designating, by another control plane component of the virtualized computing service in response to a request from a client, a first collection of network addresses for the second isolated virtual network;
wherein said determining the first amount of data transmitted between the first isolated virtual network and the first endpoint category comprises:
determining that the destination network address of the first metric set is a member of the first collection; and
computing the first amount of data based at least in part on the packet size indicated in the first metric set.

8. The method as recited in claim 6, wherein the first isolated virtual network is established on behalf of a first client, wherein the destination network address is in an address range of the second isolated virtual network, further comprising:
establishing, by another control plane component of the virtual computing service, a first dedicated private network link between the first isolated virtual network and a client network of the first client;
selecting, by one or more routing components of the virtual computing service, a route for the network packet, wherein the route includes the dedicated private network link.

9. The method as recited in claim 6, further comprising:
receiving, via a programmatic interface implemented at the control plane component, a request for a traffic distribution report of the first isolated virtual network; and
transmitting, in response to the request, an indication of at least the first amount of data.

10. The method as recited in claim 6, wherein the predictive model comprises one or more of: (a) a regression model, or (b) a time-series model.

11. The method as recited in claim 6, wherein the virtualized computing service is implemented at a provider network, wherein the second endpoint category comprises an address assigned to a different service implemented at the provider network; and further comprising:
determining, at the control plane component based at least in part on the analysis of a plurality of metric sets including the first metric set, a second amount of data transmitted between the first isolated virtual network and the second endpoint category.

12. The method as recited in claim 6, wherein the virtualized computing service is implemented at a provider network, wherein the second endpoint category comprises a set of addresses of the public Internet, and further comprising:
determining, at the control plane component based at least in part on the analysis of a plurality of metric sets including the first metric set, a second amount of data transmitted between the first isolated virtual network and the second endpoint category.

13. The method as recited in claim 6, wherein said identifying the one or more endpoint categories includes receiving an indication, from a client via a programmatic interface, of at least the first endpoint category.

14. The method as recited in claim 6, further comprising:
collecting, at the virtualization management component, a second metric set associated with a network packet directed to the guest virtual machine, wherein the second metric set includes one or more of: (a) a source network address, (b) a timestamp, or (e) a packet size; and
categorizing, by the control plane component, traffic directed to the first isolated virtual network based at least in part on an analysis of another plurality of metric sets including the second metric set.

15. The method as recited in claim 6, wherein said identifying the one or more endpoint categories comprises examining at least a portion of a routing table of the first isolated virtual network.

16. A non-transitory computer-accessible storage medium storing program instructions that when executed on one or more processors implement a traffic analyzer of a provider network, wherein the traffic analyzer is configured to:
identify a plurality of endpoint categories with respect to network traffic associated with a first isolated virtual network of the provider network, including a first endpoint category which includes an endpoint configured within a second isolated virtual network of the virtualized computing service, and a second endpoint category does not include either the first isolated virtual network or the second isolated virtual network, and wherein the first isolated virtual network comprises a particular configuration of resources, pathways, and connections;
determine, based at least in part on an analysis of a plurality of metric sets, including a particular metric set collected at a first virtualization host of the provider network, and based at least in part on the identified plurality of endpoint categories, (a) a first amount of data transmitted between the first isolated virtual network and the first endpoint category during a selected time interval, wherein the first endpoint category does not include the first isolated virtual network, and (b) a second amount of data transmitted between the first isolated virtual network and the second endpoint category, wherein the particular metric set is associated with a particular network packet transmitted between the first virtualization host and a particular endpoint, and wherein the particular metric set includes one or more of: (a) a source network address, (b) a destination network address, or (c) a packet size;
store a result of a predictive model to which the first amount of data is provided as input, wherein the result comprises an indication of an expected future level of traffic between the first isolated virtual network and the first endpoint category; and
generate a change recommendation for the particular configuration of resources, pathways, and connections of the first isolated virtual network based at least in part on the result of the predictive model.

17. The non-transitory computer-accessible storage medium as recited in claim 16, wherein to determine the first amount of data transmitted between the first isolated virtual network and the first endpoint category, the traffic analyzer is configured to:
obtain metadata indicating a first collection of network addresses selected for the second isolated virtual network by a client on whose behalf the second isolated virtual network is established; and
determine that the destination network address of the first metric set is a member of the first collection.

18. The non-transitory computer-accessible storage medium as recited in claim 16, wherein the traffic analyzer is configured to:

receive, via a programmatic interface, a request for a traffic distribution report of the first isolated virtual network; and transmit, in response to the request, an indication of at least the first amount of data.

19. The non-transitory computer-accessible storage medium as recited in claim 16, wherein the predictive model comprises one or more of: (a) a regression model, or (b) a time-series model.

20. The non-transitory computer-accessible storage medium as recited in claim 16, wherein to identify the one or more endpoint categories, the traffic analyzer is configured to:

receive an indication, from a client via a programmatic interface, of at least the first endpoint category.

21. The non-transitory computer-accessible storage medium as recited in claim 16, wherein the particular network packet is sent from the first isolated virtual network to the second isolated virtual network via a particular pathway, wherein the particular pathway includes one or more of: (a) a client network outside the provider network, or (b) a dedicated physical link established between the provider network and an external network, wherein to generate the change recommendation for the particular configuration of resources, pathways, and connections of the first isolated virtual network, the traffic analyzer is configured to:

generate the change recommendation based at least in part on the expected future level of traffic, wherein the change recommendation comprises one or more of: (a) a deployment of an additional data plane component of the virtual computing service or (b) an establishment of an additional pathway between the first isolated virtual network and the second isolated virtual network.

* * * * *